Figure 1:
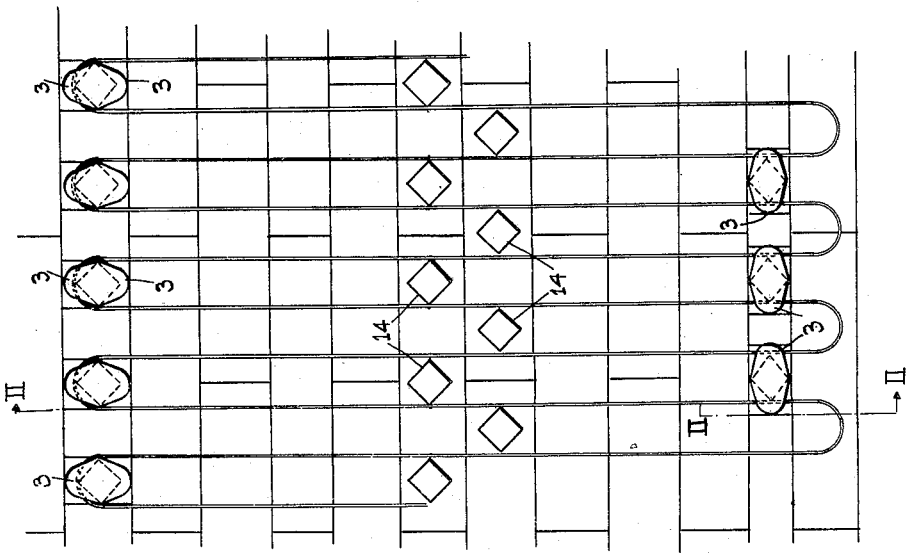

April 7, 1925.

R. E. TALLEY 1,532,558

RESISTANCE HEATER SUPPORT

Filed Aug. 4, 1922

6 Sheets-Sheet 1

INVENTOR

Rendal E. Talley
by Damon S. Wolcott
ATTORNEY

April 7, 1925.

R. E. TALLEY

RESISTANCE HEATER SUPPORT

Filed Aug. 4, 1922

6 Sheets-Sheet 2

INVENTOR
Rowdal E. Talley
by Dammb Wolcott
ATTORNEY

FIG. 7
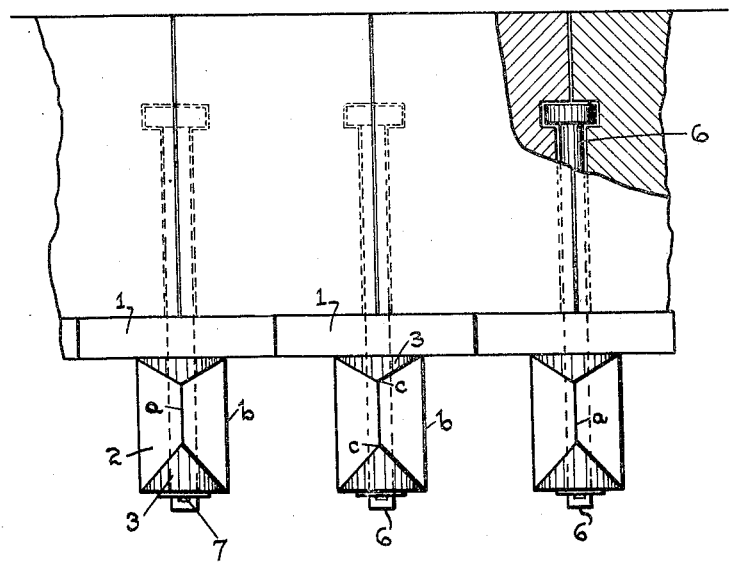
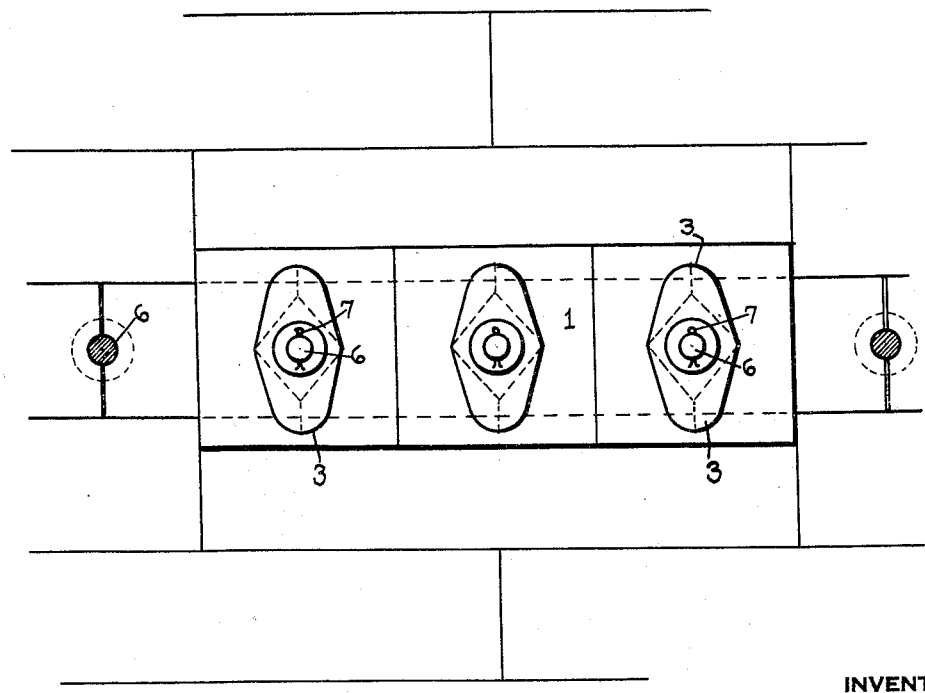
FIG. 8

April 7, 1925.

R. E. TALLEY

RESISTANCE HEATER SUPPORT

Filed Aug. 4, 1922

1,532,558

6 Sheets-Sheet 4

INVENTOR

Rendal E. Talley
by Damon S. Wolcott
ATTORNEY

April 7, 1925.

R. E. TALLEY 1,532,558

RESISTANCE HEATER SUPPORT

Filed Aug. 4, 1922

6 Sheets-Sheet 5

INVENTOR
Randal E. Talley
by Damari G. Wolcott
ATTORNEY

April 7, 1925.                                                      1,532,558
R. E. TALLEY
RESISTANCE HEATER SUPPORT
Filed Aug. 4, 1922            6 Sheets-Sheet 6

INVENTOR

Patented Apr. 7, 1925.

1,532,558

UNITED STATES PATENT OFFICE.

RANDAL E. TALLEY, OF IRWIN, PENNSYLVANIA, ASSIGNOR TO GEORGE J. HAGAN COMPANY, OF PITTSBURGH, PENNSYLVANIA, A CORPORATION OF PENNSYLVANIA.

RESISTANCE-HEATER SUPPORT.

Application filed August 4, 1922. Serial No. 579,627.

*To all whom it may concern:*

Be it known that I, RANDAL EARL TALLEY, residing at Irwin, in the county of Westmoreland and State of Pennsylvania, a citizen of the United States, have invented or discovered certain new and useful Improvements in Resistance-Heater Supports, of which improvements the following is a specification.

It is the usual practice to arrange the heating element in electric furnaces of the metallic resistor type, in loops along the side walls and top of the furnace, the loops being supported by studs or fingers secured to the furnace walls, and projecting inwardly therefrom, said studs being formed of refractory material such as fire-clay or alundum. For suspending the heating element along the side walls, these fingers have their upper surfaces grooved for the reception of the heating element usually having the form of a ribbon, and the surfaces at the bottom of the grooves are formed on the arcs of circles corresponding to the curvature of the loops, so that the under surfaces of the ribbons will contact with the studs for practically the entire curved surface of the loops. The grooves formed in the studs or fingers are made of a width only slightly wider than the ribbons. As a result of such construction, the under sides and edges of the ribbon are practically muffled by the refractory studs, and heat radiating from such surfaces of the ribbons is effective only in heating the studs or fingers and the heat of the studs or fingers in turn tends to raise the temperature of the ribbon thereby increasing the resistance of the portions of the ribbons in contact with the studs. Such increase of resistance results in further raising the temperature of the ribbons and the studs in contact with the ribbons. At the high temperatures to which the ribbons in contact with the studs are subjected, the material (nickel-chromium or similar heat-resisting alloy) from which the ribbons are formed, will rapidly be destroyed through oxidation.

The object of the invention described herein is to construct the supporting and spacing members of the heating elements so that the areas of contact between such members and the heating elements will be so small that there will not be any muffling of the ribbon by the members, and the heat radiated from the members will not tend to cause an excessive heating of the heating element.

The invention is hereinafter more fully described and claimed.

Figure 2:
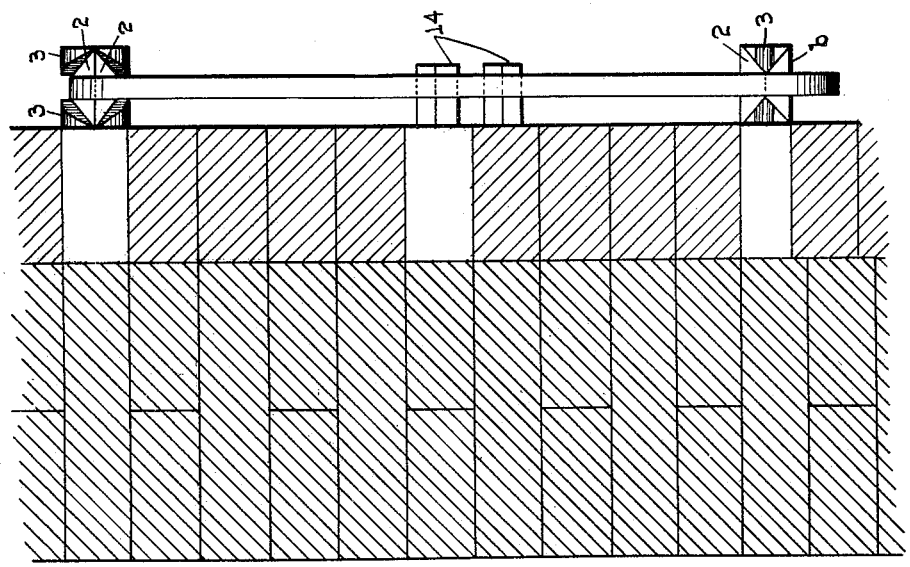
Figure 3:
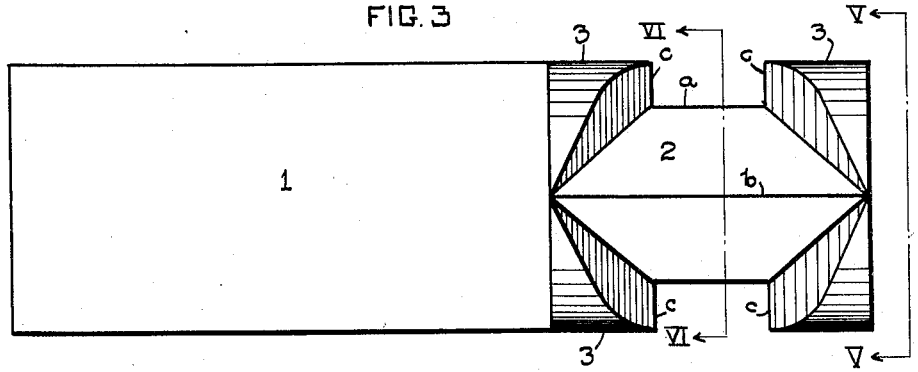
Figure 4:
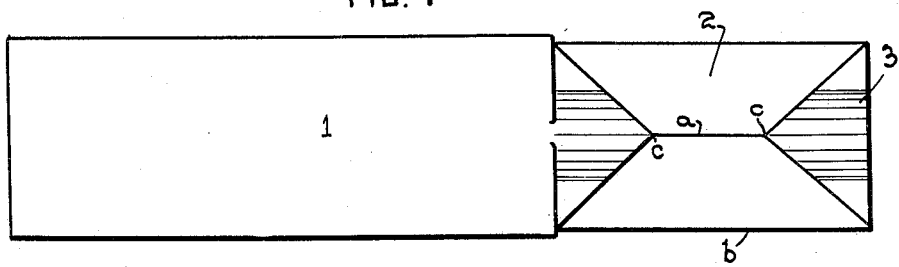
Figure 6:
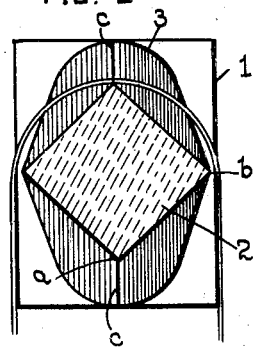
Figure 9:
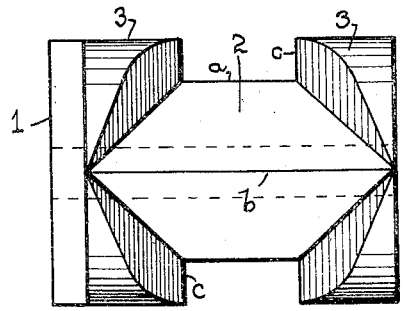
Figure 10:
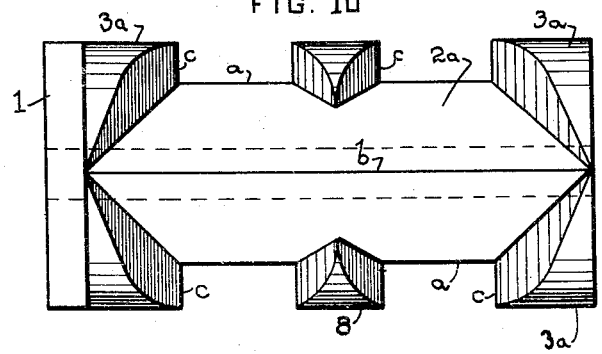
Figure 11:
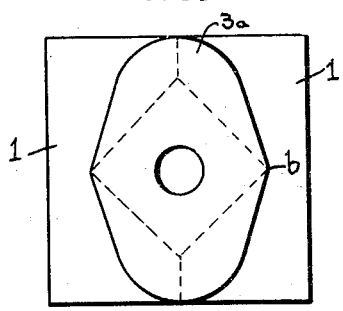
Figure 12:
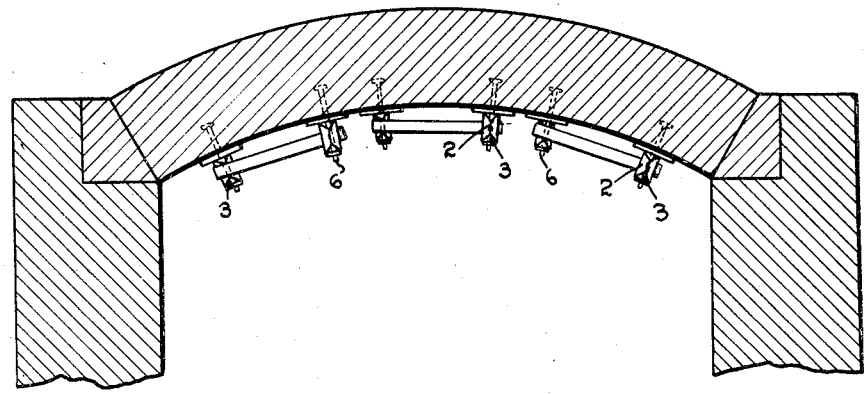
Figure 13:
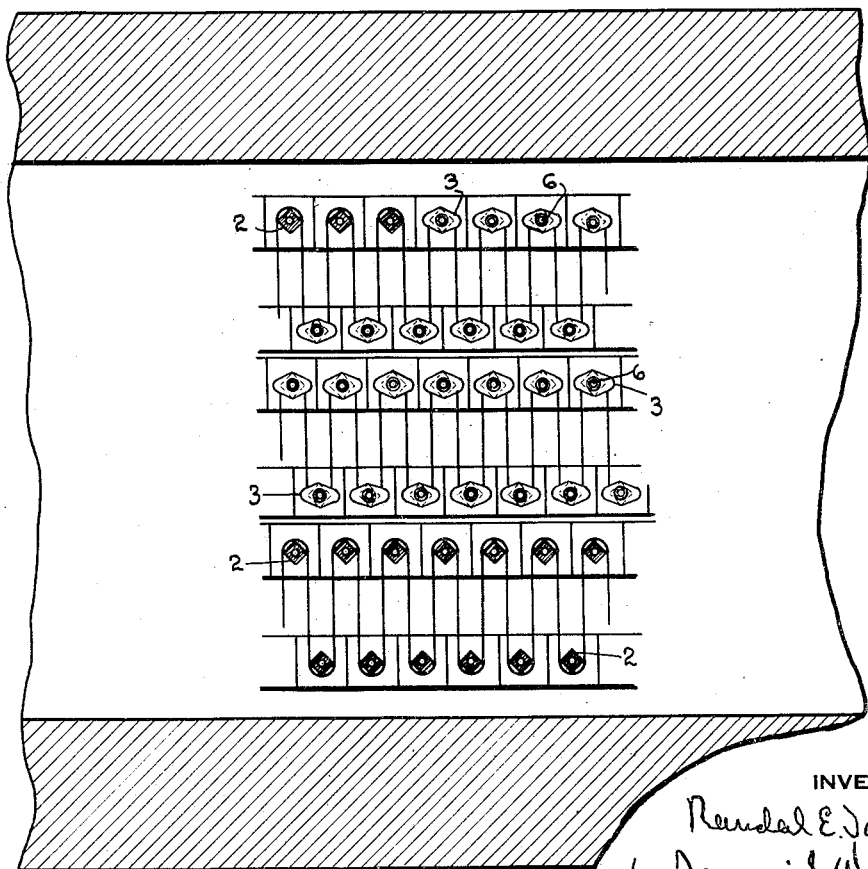
Figure 14:
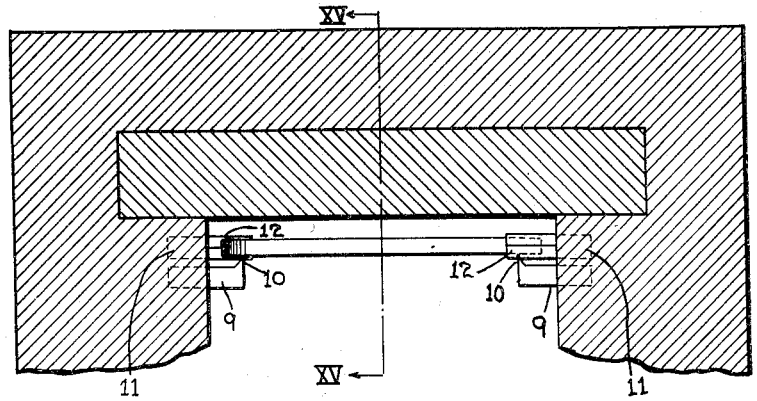
Figure 15:
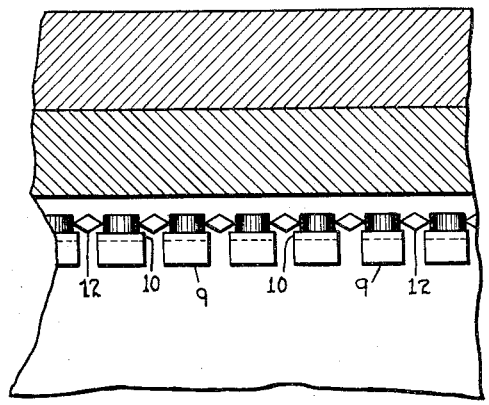

In the accompanying drawings forming a part of this specification, Fig. 1 is an elevation of a wall of a heating furnace provided with the improved ribbon supports; Fig. 2 is a sectional view on a plane indicated by the line II—II, Fig. 1; Fig. 3 is a side elevation of the supporting and spacing element; Fig. 4 is a top plan view and Fig. 5 an end elevation of the same; Fig. 6 is a sectional view on a plane indicated by the line VI—VI, Fig. 3; Fig. 7 is a plan view illustrating a modification of the manner of securing the supporting and spacing elements to the furnace wall; Fig. 8 is an elevation of the construction shown in Fig. 7; Fig. 9 is a side elevation of the refractory portion of the elements shown in Figs. 7, 8; Fig. 10 is a side elevation of a form of element for supporting two ribbons; Fig. 11 is an end view of the same; Fig. 12 is a sectional elevation of a portion of a furnace showing the heating elements under the roof or top of the furnace; Fig. 13 is a plan view of the underside of the roof shown in Fig. 12; Fig. 14 is a sectional elevation of the upper portion of a furnace and illustrating a modification in the manner of supporting the heating elements under the roof; and Fig. 15 is a sectional view on a plane indicated by the line XV—XV, Fig. 14.

Figure 5:
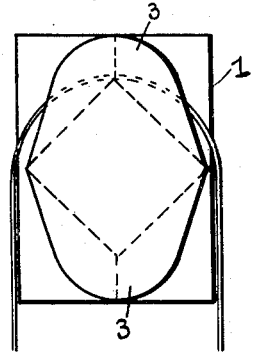

In the practice of the invention the stud or finger from which the ribbon is suspended is formed with a knife edge on which the heating element rests. When the studs or fingers are employed, looped heating elements are preferably formed with a supporting edge and also with oppositely disposed knife edges arranged in a plane below the supporting edge and adapted to prevent the legs of a loop moving towards each other, and in such forms the ribbons are prevented from lateral movement on the studs by means of knife-edge abutments. The foregoing features are embodied in the stud which has the greater portion 1 of its length made oblong in cross-section, when it is desired to support the stud by incorporating a portion thereof in the furnace wall, as shown in Figs. 3 and 4. Adjacent to one end the stud is made diamond shape in cross-section, the diagonals of the diamond shaped spool 2 having lengths approximately equal to the widths of the short sides of the stud. As shown in Figs. 5 and 6, the diamond or spool is so formed or located that two of its angles forming the knife edges $b$ will coincide with the wider sides of the block, and the other angles forming the knife edge $a$ will be within the shorter sides of the stud, so that abutments 3 are formed at each end of the knife edges $a$. These abutments 3 which are spaced apart a distance little greater than the widths of the ribbon to be supported, are made V-shaped so as to form knife edges $c$ in line with the edges $a$ of the spool. As the ribbons are resilient not only when cold but also at the temperatures to which they are heated when in use, the portions of the loop adjacent to the line of contact with the knife edge $a$ will not ordinarily contact with the surfaces $c$ of the spool intermediate of the supporting edge $a$ and the lateral edges $b$, but as the weight of the legs of the loops will tend to decrease the curvature of the loops, the lateral knife edges $b$ are spaced such a distance apart as to prevent the curvature of the loop being reduced to such a degree that the spaces between the loop and the sides $c$ will be so reduced as to prevent a free circulation between the ribbon and the sides $c$.

The features of the improvement claimed herein are in the order of their importance a knife-edge forming the vertical support, and knife-edges arranged below and on opposite sides of a vertical plane coinciding with the supporting edge and adapted to maintain the desired spaced relation between the legs of a loop and prevent an undesirable flattening of the sides of the eye of the loop. It is preferred however to construct the spool with four knife edges as shown and to provide knife-edge abutments in line with both of the oppositely disposed edges $a$, as such construction permits of the employment of the studs not only for supporting the loops and spacing the legs of each loop, but also for maintaining the lower portions of adjacent loops in spaced relation. When employed for this purpose, the studs are turned ninety degrees from the position they occupy when employed for supporting the loops, and are preferably arranged below a supporting stud and between the legs of each loop so that the legs will pass between the abutments and bear against the oppositely disposed knife-edges $a$.

In lieu of making the studs sufficiently long to be incorporated in the wall of the furnace, as shown in Figs. 1 to 6, they may be secured to the wall by bolts 6 passing through the studs and extending a suitable distance into the wall of the furnace, as shown in Figs. 7 to 11. In practice the bolts will be secured in the walls, the stud pushed onto the projecting ends of the bolts and secured thereon by cotter-pins 7 or any other suitable means. It will be understood that although either of the described means is suitable for securing the studs in position, any other means suitable for the purpose may be employed.

It is frequently desirable to employ a plurality of ribbons; in such cases the stud is constructed as shown in Figs 10 and 11. The spool or diamond shaped portion $2^a$ is made of a length dependent upon the number and widths of loops to be suspended. At its ends the spool is provided with oppositely disposed V-shaped abutments $3^a$ and with one or more abutments 8 intermediate the end abutments, the opposite faces of the intermediate abutment being provided with knife edges.

As shown in Figs. 12 and 13 the improved stud can be employed for supporting heating elements immediately below the roof of the furnace. While the form of studs shown in Figs. 1 to 6 can be employed for supporting the elements, by embodying the body portions in the brick work forming the roof, it is preferred to employ the form of studs shown in Figs. 7 to 11, by means of bolts 6 having their beaded ends imbedded in the roof. When employed for supporting heating elements arranged under the roof, the edges of the heating elements will rest on the knife edges of the abutments 3.

It is preferred to support the heating elements in narrow furnaces by the form of studs shown in Figs. 14 and 15. These studs consist of a body portion 9 adapted to be incorporated in the wall of the furnace, the stud being made of such length that a portion thereof will project into the furnace as shown in Fig. 14. The portion projecting into the furnace is provided with an upwardly projecting knife edge 10 on which the heating element rests. In order to prevent any lateral displacement of the portions of the heating elements when supported as shown in Figs. 14 and 15, spacing studs 11 having oppositely disposed knife edges are interposed between adjoining portions of the heating element. These spacing studs are preferably constructed with a body portion 11 adapted to be imbedded in the wall of the furnace and with a diamond shaped portion 12 projecting into the furnace and extending between adjoining portions of the heating element.

It has been found that on the opening of the door of a furnace having metallic heating elements arranged as shown herein, the cold air will have such a cooling action on the sides of the ribbons facing the door as to cause more or less contraction of the metal on such side and a consequent bowing or curving of the ribbon. This curving is not the same in all parts and hence the established spacing of the ribbons is destroyed. In order to maintain such spacing, members 14 having oppositely disposed knifes edges are employed. These members may be secured in position by so imbedding portions in the wall of the furnace that the diamond shaped inner ends will project between adjoining portions of the ribbon as shown in Fig. 2. It is preferred that these spacing members should be arranged in staggered relation as shown.

The studs or fingers may be made of refractory insulating material or suitable metal such as chromel or calite, except where the same stud or finger forms the support for two or more heating elements in which refractory insulating material should be used.

I claim herein as my invention:

1. A stud for holding a resistance heater in proper position in a furnace and adapted to be secured to the wall of a furnace, and provided with a knife-edge forming the bearing for the resistance heater.

2. A stud for holding a resistance heater in proper position in a furnace and adapted to be secured to the wall of a furnace and provided with a knife-edge bearing for the heater, and knife edge abutments for preventing the lateral movement of the heater.

3. A stud for holding a resistance heater in position in a furnace adapted to be secured to the wall of the furnace and provided with a knife-edge for supporting the heater and with oppositely disposed knife edges arranged on opposite sides of a plane coinciding with the supporting edge.

4. A stud for holding a resistance heater in proper position in a furnace adapted to be secured to the wall of the furnace and provided with a knife edge for supporting the heater and with oppositely disposed knife edges arranged on opposite sides of a plane coinciding with the supporting edge and having oppositely disposed knife-edge abutments for preventing the lateral movement of the loop.

5. A stud for holding a resistance heater in proper position in a furnace adapted to be secured to the wall of a furnace and having a diamond shaped portion for supporting a heater and provided with abutments adapted to prevent lateral movement of the heater.

6. A stud for holding a resistance heater in position in a furnace adapted to be secured to the wall of a furnace and having a diamond shaped portion for supporting a heater and provided with oppositely disposed V-shaped abutments adapted to prevent lateral movement of the heater.

In testimony whereof, I have hereunto set my hand.

RANDAL E. TALLEY.